United States Patent
Brandl et al.

(10) Patent No.: US 10,618,348 B2
(45) Date of Patent: Apr. 14, 2020

(54) MULTIDIRECTIONAL WHEEL AND METHOD FOR MANUFACTURE OF SAME

(71) Applicant: FRESENIUS MEDICAL CARE DEUTSCHLAND GMBH, Bad Homburg (DE)

(72) Inventors: Matthias Brandl, Bad Koenigshofen (DE); Thomas Faulhaber, Bergrheinfeld (DE); Bernd Sonje, Remschied (DE); Jens Meeske, Schwelm (DE)

(73) Assignee: PRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 306 days.

(21) Appl. No.: 15/553,639

(22) PCT Filed: Feb. 22, 2016

(86) PCT No.: PCT/EP2016/000308
§ 371 (c)(1),
(2) Date: Dec. 26, 2017

(87) PCT Pub. No.: WO2016/134843
PCT Pub. Date: Sep. 1, 2016

(65) Prior Publication Data
US 2018/0126779 A1    May 10, 2018

(30) Foreign Application Priority Data
Feb. 26, 2015   (DE) .................. 10 2015 002 360

(51) Int. Cl.
B60B 19/00   (2006.01)
B60B 3/08   (2006.01)
B60B 19/12   (2006.01)

(52) U.S. Cl.
CPC ............ *B60B 19/003* (2013.01); *B60B 3/085* (2013.01); *B60B 19/12* (2013.01); *B60B 2200/26* (2013.01);
(Continued)

(58) Field of Classification Search
CPC ....... B60B 19/003; B60B 19/12; B60B 3/085; B60B 2320/10; B60B 2310/616; B60B 2310/204; B60B 2200/26
(Continued)

(56) References Cited

U.S. PATENT DOCUMENTS

| 5,551,349 A | 9/1996 | Bodzin |
| 6,360,865 B1 | 3/2002 | Lenn |

(Continued)

FOREIGN PATENT DOCUMENTS

| DE | 202005012682 | 12/2006 |
| DE | 102006037108 | 2/2008 |

(Continued)

*Primary Examiner* — S. Joseph Morano
*Assistant Examiner* — Jean W Charleston
(74) *Attorney, Agent, or Firm* — Jacobson Holman, PLLC.

(57) ABSTRACT

A multidirectional wheel in which the wheel has a wheel body rotatable about a wheel axle and having two half-shells and has a plurality of rotating bodies which are located at the outer periphery of the wheel body and via which the wheel can roll off. At least one half-shell, and preferably both half-shells, has/have mounts in which end regions of the axles of the rotating bodies are received or which project into end regions of the axles of the rotating bodies, with the mounts of the half-shells being configured as continuously converging.

24 Claims, 3 Drawing Sheets

(52) U.S. Cl.
CPC ... *B60B 2310/204* (2013.01); *B60B 2310/616* (2013.01); *B60B 2320/10* (2013.01)

(58) Field of Classification Search
USPC ........................................................ 301/5.23
See application file for complete search history.

(56) References Cited

U.S. PATENT DOCUMENTS

| | | | |
|---|---|---|---|
| 7,112,350 B1* | 9/2006 | Roberts | B05B 13/06 427/236 |
| 8,540,038 B1 | 9/2013 | Ullman | |
| 8,833,862 B2 | 9/2014 | Gunther | |
| 2006/0125309 A1* | 6/2006 | Huang | B60B 19/003 301/5.23 |
| 2010/0270850 A1* | 10/2010 | Brudniok | B60B 19/003 301/5.23 |
| 2012/0019048 A1* | 1/2012 | McKinnon | B60B 19/12 301/5.23 |
| 2013/0257138 A1* | 10/2013 | Chang | B60B 19/12 301/5.23 |
| 2013/0292918 A1* | 11/2013 | Schlee | B60B 19/12 280/79.11 |
| 2014/0054952 A1* | 2/2014 | Krell | A63C 17/223 301/5.305 |

FOREIGN PATENT DOCUMENTS

| | | |
|---|---|---|
| WO | WO 2011/047443 | 4/2011 |
| WO | WO 2011082593 | 7/2011 |

\* cited by examiner

MULTIDIRECTIONAL WHEEL AND METHOD FOR MANUFACTURE OF SAME

BACKGROUND OF THE INVENTION

1. Field of the Invention

The present invention relates to a multidirectional wheel, wherein the wheel has a wheel body rotatable about a wheel axle and having two half-shells as well as a plurality of rotating bodies which are located at the outer periphery of the wheel body and via which the wheel can roll off.

2. Description of the Related Art

It is known from the prior art e.g. to provide medical devices such as dialysis devices with casters to ensure their movability. Swivel castors or trestle castors or also so-called multidirectional wheels, which allow movability in more than one direction, are used as casters in this respect, for example. Such a multidirectional wheel is known, for example, from WO 2011/113526 A2. The wheel disclosed in this document comprises a wheel body as well as a plurality of rotating bodies in the form of rollers which are located at the outer periphery of the wheel body. Provision is made in this respect that the longitudinal axis of the rollers extends either in the rotational plane of the wheel body or at an angle thereto.

DE 10 2008 019 976 A1 discloses a multidirectional wheel in which the rollers are arranged at mount components which are in turn fastened to half-shells and extend between them. The rollers are arranged with axle journals rotatably in bearing points of the mount components.

A roll arrangement having a plurality of roller-like rotating bodies is known from U.S. Pat. No. 6,360,865 which are received between two bearing points. A bearing axle whose end regions are fixed in the bearing points extends through the rotating bodies.

U.S. Pat. No. 7,641,288 discloses a multidirectional wheel in which a bearing axle which is screwed to support points in its end regions extends through the rollers.

In the multidirectional wheels known from the prior art, there is a disadvantage as part of the wheel manufacture in that each rotating body or each roller is individually screwed to the named bearing points or has to be fastened in a different manner. It would be advantageous in a hygienic and also process engineering aspect to use as few individual elements and in particular fastening elements such as screws, washers, etc. as possible.

SUMMARY OF THE INVENTION

It is the underlying object of the present invention to further develop a multidirectional wheel such that its manufacture is possible in a comparably simple manner.

This object is achieved by a multidirectional wheel having a wheel body rotatable about a wheel axle and having two half shells and a plurality of rotating bodies which are located at the outer periphery of the wheel body, wherein according to a first configuration at least one half-shell, and preferably both half-shells, has/have mounts in which end regions of the axles of the rotating bodies are received or which project into end regions of the axles of the rotating bodies, wherein the mounts of the half-shells are configured as continuously converging.

Mounts are to be understood as those parts of the half-shells which hold the axles of the rotating bodies. The mounts can be configured as recesses into which the end regions of the axles project. The mounts can also be configured as projections which project into cut-outs of the axles and hold the rotating bodies in this manner.

The rotating bodies preferably have at least one base body forming the running surface and one or more axles or axial sections, wherein the base bodies can be rotated relative to the axles or axial sections so that the rotating bodies can be rotated relative to the half-shells and thus relative to the wheel. The axles or axial sections are preferably arranged non-rotatably in or at the mounts after the completion of the wheels or after the fixing of the half-shells to one another.

However, an embodiment is also covered by the invention in which the axles are rotatable relative to the mounts at which they are arranged.

The term "continuously converging" means an embodiment of the mounts in which the cross-sectional surface of the mount increases constantly or step-wise in the axial direction of the rotating bodies received therein/thereat (if the mount is designed as a cut-out) or reduces constantly or step-wise (if the mount is configured as a projection). A conical design of the mount is preferred, with a single conical section or a plurality of conical sections having a different inclination of the surface being able to be provided. A step-shaped cylindrical geometry having cross-sections increasing or decreasing in one direction is also conceivable and covered by the invention.

The end regions of the axles of the rotating bodies are preferably complementary to the shape of the mounts i.e. are likewise configured as continuously converging.

The axles of the rotating bodies can be formed in one part or in multiple parts in that they represent an integral component of the rotating bodies.

The mounts of the half-shells can all be configured as cut-outs or as projections. A combination is also conceivable and covered by the invention. Such a combination could be configured, for example, such that a half-shell only has mounts in the form of cut-outs and the other half-shell only has mounts in the form of projections. A mixed embodiment is also conceivable and covered by the invention such that a half-shell has both mounts which are configured as cut-outs and mounts which are configured as projections.

Each half-shell preferably has a plurality of mounts which are spaced apart from one another in the peripheral direction of the wheel.

Provision is thus made in accordance with the invention that both half-shells preferably have mounts which are formed, for example, as conical or tapered and into which the end regions of the axle of the rotating body such as a roller are received or which project into the end regions of the axle of the rotating body.

Further fastening elements such as screws, washers, etc. are preferably not provided for receiving the axial ends.

The rotating bodies are preferably fixed by a press fit between the mounts.

A further substantial advantage of the embodiment of a multidirectional wheel in accordance with the invention comprises the fact that the manufacture of the half-shells can be carried out in an injection molding process without ejector support, which would not be possible with a half-shell having a cylindrical mount for the axles of the rotating bodies since otherwise the half-shell could not be demolded from the injection molding tool.

The injection molded part, i.e. the half-shell, can be demolded from the injection molding tool by a rotational movement, for example, without an ejector support taking place, due to the special design of the mount of one or both half-shells, for example in conical form.

The present invention furthermore relates to a multidirectional wheel according to a second configuration in which the rotating bodies have an axle which comprises at least two axial sections between which at least one spring element is arranged which exerts a force acting in the direction of the end regions of the axle on the axial sections or that the axles of the rotating bodies cooperate with mounts of the half-shells, wherein the mounts are spring-loaded such that they exert a force acting in the direction of the axle of the rotating body arranged in the mount.

A combination such that both the axles and the mounts are spring-loaded is also conceivable and covered by the invention.

It is possible in this manner to clamp the rotating body, for example the roller, between the two half-shells. Such a fixing of the axles inter alia brings about the advantage that production tolerances of the half-shells and of the axles can be compensated and that a correct positioning of the rotating body relative to the half-shell is possible due to the construction in accordance with the second configuration despite any production tolerances. A secure fixing of the axles takes place apart from this.

In a preferred embodiment of the invention, both the first and second configurations are combined with one another.

Provision is preferably made that the mounts of one half-shell, or preferably of both half-shells, are integral components of the half-shells. The mounts are thus not formed by separate parts, but rather by mounts integrally shaped into the half-shells.

Provision can further be made that the mounts of both half-shells are arranged offset from one another in the peripheral direction of the wheel. In this respect, the mounts are aligned such that the longitudinal axes of the rotating bodies arranged in the mounts extend obliquely to, and not in parallel with, the rotating axle of the wheel.

In this case, an oblique position of the axle of the rotating body relative to the rotational plane of the multidirectional wheel results which is formed by its longitudinal sectional plane.

The half-shells and the mounts integrated therein are preferably symmetrical in their geometry, but not in a mirror image. If e.g. a ring section of a half-sell is looked at which comprises all the mounts, this ring sections could be used for the right half-shell and for the left half-shell of the wheel.

It is pointed out at this point that the term "half-shell" covers any desired wheel part and in particular wheel half, irrespective of whether a shell shape or any other desired shape is present.

In a further embodiment of the invention, the mounts of the half-shell are conical, with the cone extending so that the cross-sectional surface of the mount increases in size away from the end region of the axle up to the rotating body.

Provision can furthermore be made that one or two half-shells are formed as injection molded parts.

As stated above, a comparatively simple manufacturing process can thereby be realized. The, for example, conical or tapered configuration of the mounts has the result that the injection molded part can be demolded from the injection molding tool, for example by a rotation, without any ejector support.

Provision is made in a further embodiment of the invention that the axle is arranged in a bearing sleeve. The axle or its axial sections extend(s) through this bearing sleeve. The axle itself can be arranged in a fixed position such that the bearing sleeve rotates about the axle or can also be configured such that the axle rotates in the mount.

Provision is made in a further embodiment of the invention that the bearing sleeve is surrounded by a liner which forms the running surface of the rotating body, with provision preferably being made that the liner is an elastomer.

The liner can, for example, be sprayed onto the bearing sleeve.

The above-named spring element which exerts a force on the axial sections and/or on the mounts can be configured, for example, as a spring such as a spiral spring or also as an elastomer part, in particular as an elastomer sphere.

The present invention furthermore relates to a medical device, in particular to a dialysis device, having at least one multidirectional wheel in accordance with any of the foregoing configurations for which provision is made above.

A further aspect of the invention relates to a method of manufacturing a multidirectional wheel, in particular a multidirectional wheel in accordance with any of the foregoing configurations for which provision is made above, wherein the method comprises the step of inserting the rotating body into the mounts of the half-shells and the step of the subsequent rotating of the half-shells relative to one another.

In this case, the multidirectional wheel is manufactured such that the half-shells are first located in a first rotation position relative to one another. In this position, the axles of the rotating bodies are then inserted into the mounts with at least one axle end.

In a second step, a rotary relative rotation of the half-shells is then carried out such that the rotating bodies are reliably fixed in or at the mounts of the half-shells.

A helical relative movement of the half-shells is preferably carried out, namely a rotation of the half-shells to one another and a translation toward one another, wherein the axis of rotation of the wheel forms the helical axis.

The axles of the rotating bodies preferably have clearance to the mounts until the assembly process has finished. This clearance facilitates the assembly of the wheel.

It is thus achieved in one step, namely in a relative counter-rotating rotational movement of the half-shells, that all the axles of the rotating bodies and preferably the roller axles are fixed. As stated above, any production tolerances of the half-shells and of the axles are compensated in that the mounts and/or the axles are formed with a spring element which has the object of pressing the axle ends apart or of pressing the mounts to the axles so that they lie reliably in the mounts.

Once the two half-shells have adopted the correct position relative to one another, the half-shells can, for example, be connected to one another by screwing so that a relative rotation is precluded. Other connection techniques are also conceivable instead of a screw connection.

In a further embodiment of the invention, the method comprises the step of manufacturing the half-shells by injection molding, with provision preferably being made that the step of the removal of the half-shell from the injection tool takes place without the aid of an ejector and/or by a rotary movement.

BRIEF DESCRIPTION OF THE DRAWINGS

Further details and advantages of the invention will be explained in more detail with reference to an embodiment shown in the drawing. There are shown.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
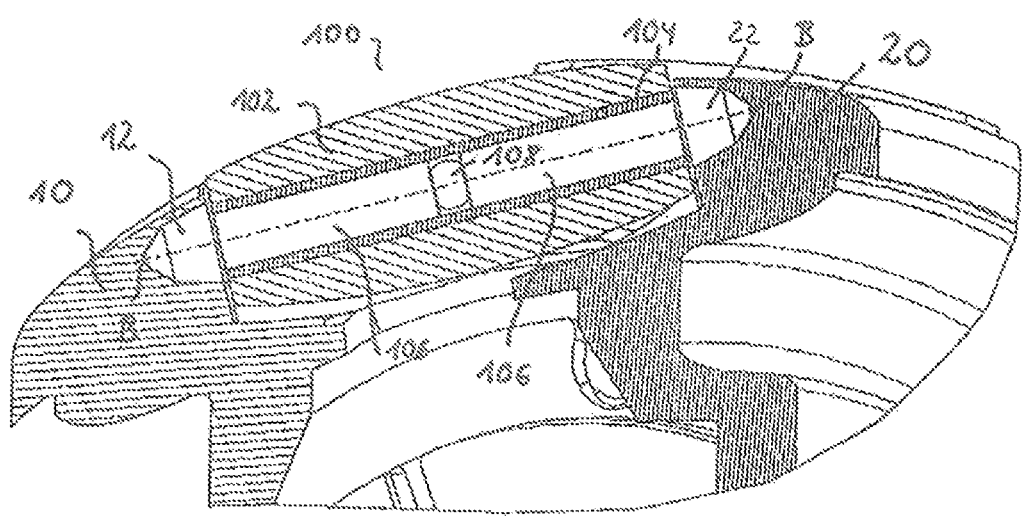
FIG. 1: a cross-sectional view through a multidirectional wheel in accordance with the present invention.

FIG. 1 shows by reference numerals 10, 20 two half-shells of a multidirectional wheel arranged in parallel with one another. A plurality of rotating bodies 100, which are configured as rollers designed with a convex surface, extend between these half-shells in the peripheral region thereof.

The rollers are preferably formed with a curved, convex surface, e.g. as ellipsoid. The surface curvature can correspond to that of a toroid.

The rollers 100 comprise an elastomer region 102 which forms the running surface of the rollers. This elastomer region 102 is manufactured by insert molding of a sleeve 104.

There are two mutually spaced apart axial sections 106 in the interior of the sleeve 104 whose end regions are received in mounts 12, 22 of the half-shells 10, 20.

As can further be seen from FIG. 1, an elastomer sphere 108 is located between the axial sections 106 which presses apart the two axial sections 106 or exerts a force on them which acts in each case in the direction of the end section of the axles located in the mounts 12, 22.

As can be seen from FIG. 1, the diameter of the continuously converging mounts 12, 22 increases from the base region B of the mounts toward the actual rotating body 100, which brings about the advantage that the half-shells 10, 20 can be manufactured in a single-stage injection molding process, and indeed without ejector assistance. A release of the half-shells from the injection molding tool can take place, for example, by a rotary movement.

In the embodiment in accordance with FIG. 1, each mount has two conical sections of different inclination.

The further manufacture of the multidirectional wheels in accordance with the invention takes place in that the two half-shells 10, 20 are first arranged in a first rotation position relative to one another, the rotating bodies 100 are then inserted or are positioned relative to the half-shells and in that then a relative movement or a relative rotation as well as a movement of the two half-shells 10, 20 toward one another is carried out such that the rotating bodies 100 are reliably received between the two half-shells 10, 20, such as can be seen from FIG. 1.

The fact that the two axial sections 106 are spring-loaded brings about the above-named advantage that any production tolerances of the half-shells 10, 20 or of the mounts 12, 22 play a subordinate role and a reliable fixing of the rotating bodies 100 takes place despite such production tolerances.

Figure 2:
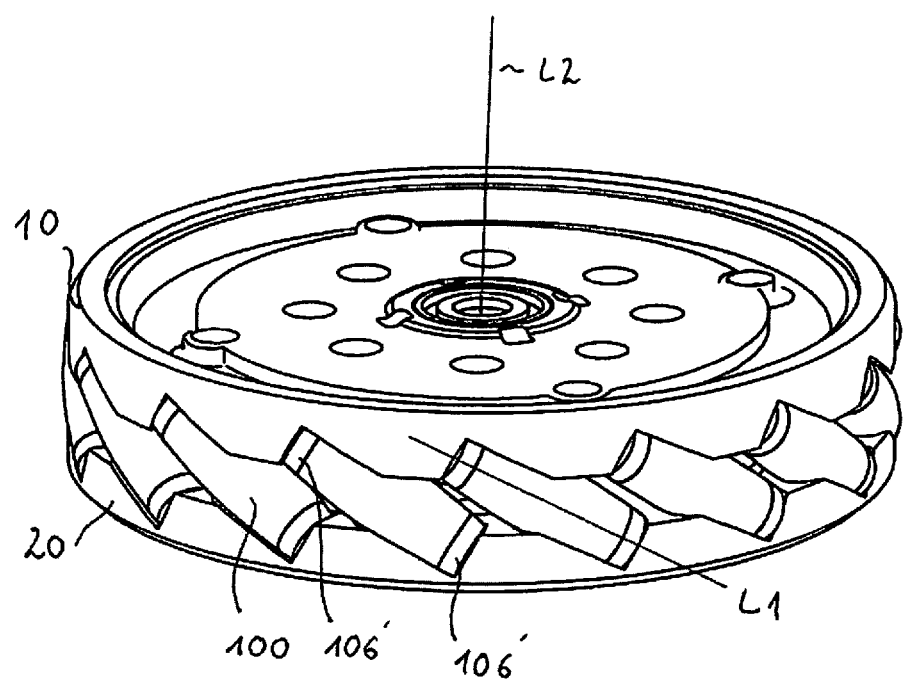
FIG. 2: a perspective view of the multidirectional wheel in accordance with the present invention after the assembly.

FIG. 2 shows the wheel in accordance with the invention in a perspective view and illustrates that the longitudinal axes L1 of the rotating bodies 100 do not extend in parallel with the longitudinal axes L2 of the wheel, but obliquely thereto.

Figure 3:
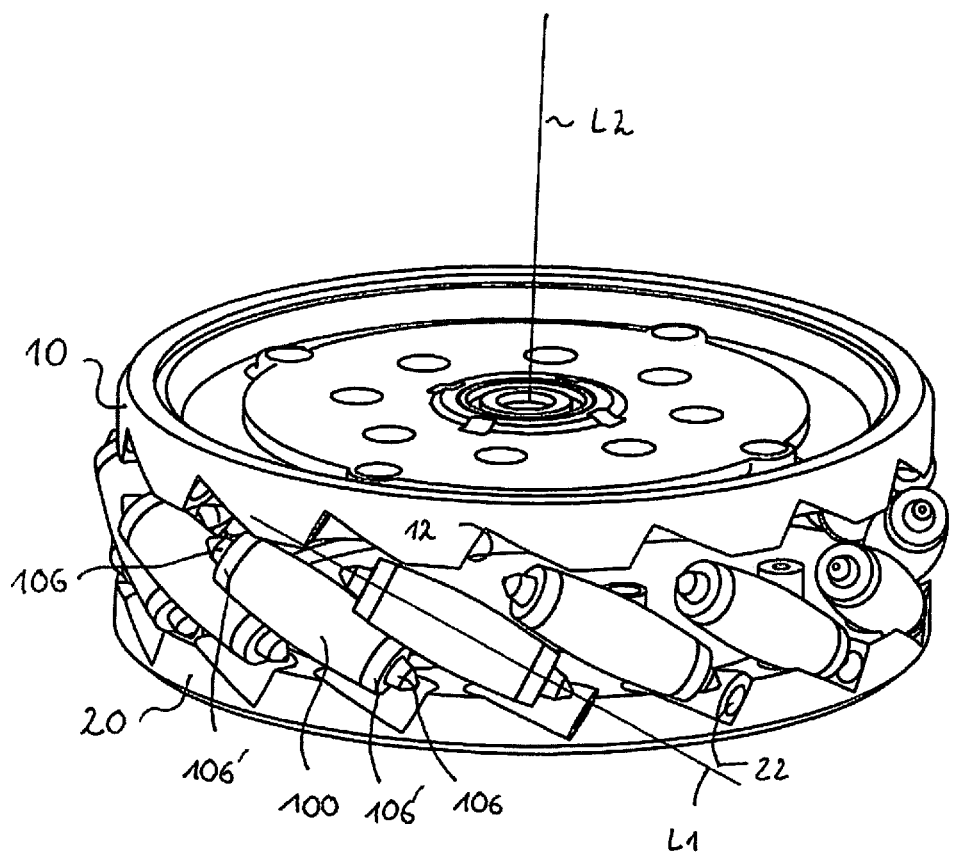
FIG. 3: a perspective view of the multidirectional wheel in accordance with the present invention before the assembly.

The same reference numerals are used in FIGS. 2 and 3 for the same elements as in FIG. 1.

The rotating bodies have a base body which forms the running surface of the rotating bodies and one or more axles or axial sections which are arranged at or in the base body.

As can be seen from FIGS. 2 and 3, the axial sections 106 are configured with end pieces 106' which adjoin the end faces of the base bodies of the rotating bodies 100 such that a stepless transition is present at the surface between the base body and the sections 106'. In contrast to this, the axial sections 106 and their end regions are located in accordance with FIG. 1 not at a section set at the end faces of the base bodies of the rotating bodies, but rather have a smaller diameter than the base bodies. The axial sections 106 extend in accordance with FIG. 1 in the interior of the rotating bodies, their ends, which are received in the mounts 12, 22, project beyond the end faces of the base bodies of the rotating bodies.

FIG. 3 is a representation of the wheel in accordance with FIG. 2 before the assembly of the half-shells 10, 20. The rotating bodies 100 are first positioned relative to the mounts 12, 22 such that they are received in the mounts 12, 22 after a rotational movement of the half-shells 10, 20 relative to one another and after a translatory movement of the half-shells 10, 20 toward one another, as is shown in FIG. 2.

As can be seen from FIG. 3, the mounts 12, 22 of the two half-shells 10, 20 are arranged offset from one another in the peripheral direction.

The longitudinal axes of the mounts do not extend in parallel with the longitudinal axis L2 of the wheel, but rather extend obliquely thereto so that the oblique position of the rotating bodies results in the mounted state such as can be seen from FIG. 2.

Subsequent to the named rotation of the half-shells relative to one another, a screw connection of the two half-shells takes places so that the multidirectional wheel is completed.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A multidirectional wheel comprising a wheel body rotatable about a wheel axle and having two half-shells and a plurality of rotating bodies which are located at the outer periphery of the wheel body and via which the wheel can roll off, the rotating bodies each having an axle, at least one half-shell having mounts in which end regions of the axles of the rotating bodies are received or which project into end regions of the axles of the rotating bodies, wherein the mounts of the half-shells are configured as continuously converging, wherein each of the axles of the rotating bodies includes at least two axial sections between which at least one spring element is arranged which exerts a force acting in the direction of the end regions of the axle onto the axial sections, or the axles of the rotating bodies respectively cooperate with the mounts of the at least one half-shell, with the mounts being spring-loaded such that the mounts exert a force acting in the direction of the axle of the rotating body arranged in the mount.

2. The multidirectional wheel in accordance with claim 1, wherein the mounts of said at least one half-shell are integral components of said half-shell.

3. The multidirectional wheel in accordance with claim 1, wherein both half-shells have mounts, the mounts of both half-shells being arranged offset from one another in the peripheral direction of the wheel such that the longitudinal axes of the rotating bodies extend obliquely to the wheel axle of the wheel body.

4. The multidirectional wheel in accordance with claim 1, wherein the mounts of said at least one half-shell are formed as conical.

5. The multidirectional wheel in accordance with claim 1, wherein one or both half-shells are formed as injection molded parts.

6. The multidirectional wheel in accordance with claim 1, wherein the axle of each rotating body is arranged in a bearing sleeve.

7. The multidirectional wheel in accordance with claim 6, wherein the bearing sleeve is surrounded by a liner which forms the running surface of the rotating body.

8. The multidirectional wheel in accordance with claim 7, wherein the liner is sprayed onto the bearing sleeve.

9. The multidirectional wheel in accordance with claim 7, wherein the liner is an elastomer.

10. The multidirectional wheel in accordance with claim 1, wherein both half-shells have mounts in which end regions of the axles of the rotating bodies are received or which project into end regions of the axles of the rotating bodies.

11. The multidirectional wheel in accordance with claim 10, wherein the mounts of both half-shells are formed as conical.

12. The multidirectional wheel in accordance with claim 1, wherein each half-shell or a ring section or a ring segment of each half-shell is formed in one piece, with the half-shell or the ring section or the ring segment including at least two mounts.

13. A multidirectional wheel, wherein the wheel has a wheel body rotatable about a wheel axle and having two half-shells as well as a plurality of rotating bodies which are located at the outer periphery of the wheel body and via which the wheel can roll off, characterized in that the rotating bodies have an axle which comprises at least two axial sections between which at least one spring element is arranged which exerts a force acting in the direction of the end regions of the axle onto the axial sections; or in that the axles of the rotating bodies cooperate with mounts of the half-shells, with the mounts being spring-loaded such that they exert a force acting in the direction of the axle of the rotating body arranged in the mount.

14. The multidirectional wheel in accordance with claim 13, wherein the spring element is configured as a spring or as an elastomer part.

15. The multidirectional wheel in accordance with claim 13, wherein the spring element is configured as an elastomer sphere.

16. A medical device comprising at least one multidirectional wheel having a wheel body rotatable about a wheel axle and having two half-shells and a plurality of rotating bodies which are located at, the outer periphery of the wheel body and via which the wheel can roll off, the rotating bodies each having an axle, at least one of said half-shells having mounts in which end regions of the axles of the rotating bodies are received or which project into end regions of the axles of the rotating bodies, wherein the mounts of the half-shells are configured as continuously converging, wherein each of the axles of the rotating bodies includes at least two axial sections between which at least one spring element is arranged which exerts a force acting in the direction of the end regions of the axle onto the axial sections, or the axles of the rotating bodies respectively cooperate with the mounts of the at least one half-shell, with the mounts being spring-loaded such that the mounts exert a force acting in the direction of the axle of the rotating body arranged in the mount.

17. The medical device in accordance with claim 16, wherein the medical device is a dialysis device.

18. A method of manufacturing a multidirectional wheel having a wheel body rotatable about a wheel axle and having two half-shells and a plurality of rotating bodies which are located at the outer periphery of the wheel body and via which the wheel can roll off, the half-shells having mounts in which end regions of the axles of the rotating bodies are received or which project into end regions of the axles of the rotating bodies, wherein the mounts of the half-shells are configured as continuously converging, the method comprising inserting the rotating bodies into the mounts of the half-shells and subsequent or simultaneously occurring rotation of the half-shells relative to one another.

19. The method in accordance with claim 18, wherein a screw connection or another fixing of the half-shells to one another takes place after rotating the half-shells relative to one another.

20. The method in accordance with claim 18, wherein the method further comprises manufacturing the half-shells by injection molding using an injection molding tool.

21. The method in accordance with claim 20, wherein the half-shells are removed from the injection molding tool without the aid of an ejector and/or by a rotational movement.

22. A multidirectional wheel comprising a wheel body rotatable about a wheel axle and having two half-shells and a plurality of rotating bodies which are located at the outer periphery of the wheel body and via which the wheel can roll off, said half-shells having mounts in which end regions of the axles of the rotating bodies are received or which project into end regions of the axles of the rotating bodies, wherein the mounts of the half-shells are configured as continuously converging, the mounts of both half-shells being arranged offset from one another in the peripheral direction of the wheel such that longitudinal axes of the rotating bodies extend obliquely to the wheel axle of the wheel body.

23. A multidirectional wheel comprising a wheel body rotatable about a wheel axle and having two half-shells and a plurality of rotating bodies which are located at the outer periphery of the wheel body and via which the wheel can roll off, at least one of said half-shells having mounts in which end regions of the axles of the rotating bodies are received or which project into end regions of the axles of the rotating bodies, wherein the mounts of said at least one half-shell are configured as continuously converging, said at least one half-shell being formed as an injection molded part.

24. The multidirectional wheel in accordance with claim 23, wherein each half-shell or a ring section or a ring segment of each half-shell is formed in one piece, with the half-shell or the ring section or the ring segment including at least two mounts.

* * * * *